United States Patent [19]

Hara et al.

[11] 3,880,950

[45] Apr. 29, 1975

[54] UNCURED UNSATURATED POLYESTER COMPOSITION

[75] Inventors: Kazuo Hara; Satoshi Bando; Toshihiko Yoshitake; Takeo Tasaka, all of Kurashiki, Japan

[73] Assignee: Kuraray Co., Ltd., Kurashiki, Okayama Prefecture, Japan

[22] Filed: May 11, 1973

[21] Appl. No.: 359,426

[30] Foreign Application Priority Data
May 15, 1972 Japan............................. 47-48386
May 15, 1972 Japan............................. 47-48387

[52] U.S. Cl. ............................................. 260/862
[51] Int. Cl. ........................ C08f 43/08; C08f 43/02
[58] Field of Search ................................. 260/862

[56] References Cited
UNITED STATES PATENTS
3,231,634  1/1966  Wismer et al. ................... 260/862
3,577,478  5/1971  Thorpe ............................. 260/862
3,733,370  5/1973  Thompson et al. ............... 260/862
3,772,241  11/1973  Kroekel ............................ 260/40 R

*Primary Examiner*—Melvin Goldstein
*Assistant Examiner*—E. A. Nielsen
*Attorney, Agent, or Firm*—Sherman & Shalloway

[57] ABSTRACT

An uncured unsaturated polyester resin composition useful in the production of molded articles of cured unsaturated polyester resins, the composition comprising (1) 60 to 97% by weight of an uncured unsaturated polyester resin which is a liquid mixture of at least one unsaturated polyester and at least one unsaturated monomer for curing the polyester, and (2) 40 to 3% by weight of a modifying polymer of the microgel structure which is obtained by polymerizing 97 to 30% by weight of at least one radical polymerizable monomer in the presence of 3 to 70% by weight of at least one rubbery polymer having double bonds in the molecule, is finely dispersible, without dissolving, in both of said unsaturated polyester resin and said unsaturated monomer for curing the polyester, and contains 0.1 to 10% by weight of carboxyl groups in the molecule.

5 Claims, No Drawings

UNCURED UNSATURATED POLYESTER COMPOSITION

This invention relates to an uncured unsaturated polyester resin composition which is useful in the production of shaped articles of cured unsaturated polyester resin.

As is well known, the uncured unsaturated polyester resin is a viscous liquid mixture having flowability which is obtained by dissolving at least one uncured unsaturated polyester (which is often called an unsaturated alkyd) in at least one unsaturated monomer for curing the polyester, for example, styrene. It is a resinous material for the preparation of cured unsaturated polyester resins which has not undergone a curing treatment.

Techniques for producing cured unsaturated polyester resins by subjecting to a curing and shaping treatment an uncured unsaturated polyester resin which contains or does not contain a reinforcing material such as glassfibers have been known for many years, and the resulting shaped articles have found a wide range of applications because of their superior properties and feasibility. However, the uncured unsaturated polyester resin has the defect of undergoing high shrinkage during curing, and therefore, cured shaped articles obtained by press molding or injection molding such a polyester resin using a mold contain strains or cracks and also suffer from various disadvantages such as the occurrence of sink marks, the lack of smoothness of the surfaces of the articles or the projection of the glassfibers incorporated onto the surfaces of the articles. In an attempt to overcome these disadvantages, there has recently been proposed a method in which a thermoplastic resin such as polystyrene, or poly(methyl methacrylate) is incorporated in an uncured unsaturated polyester resin in order to improve its shrinkage property, and then the mixture is cured. This method can give a shaped article substantially free from shrinkage caused by curing, and the above-mentioned difficulties have been overcome to a great extent.

In recent years, techniques for providing prepreg mats, sheet molding compounds (SMC) and bulk molding compounds (BMC) useful as materials for preparing reinforced cured shaped articles by press molding or injection molding have been developed. These techniques are based on the utilization of a viscosity increasing phenomenon which will occur when a small amount of a thickner such as magnesium oxide or calcium hydroxide is incorporated in an uncured unsaturated polyester resin, and involves incorporating the thickner, reinforcing fibers, a filler, a curing catalyst, and other additives if desired, in an uncured unsaturated polyester resin. The commercial importance of these techniques has very much increased. In these prepreg mats, SMC or BMC, the uncured unsaturated polyester resin is transformed to a soft solid mass devoid of stickiness owing the action of the thickner, and therefore lends itself to far easier handling and molding operation than ordinary uncured unsaturated polyester resins which are liquid and highly tacky and contain no thickner. Furthermore, such an uncured unsaturated polyester resin composition can be uniformly molded together with the reinforcing fibers. These uncured thickner-incorporated unsaturated polyester resin compositions are rarely cured and molded immediately after their preparation, but generally stored for several months at most before being put to use for preparing the desired cured articles.

The uncured unsaturated polyester resin compositions containing a thickner still have the property of being shrunk at the time of curing which property is possessed inherently by the uncured unsaturated polyester resins. Accordingly, unless some modification of the uncured and unsaturated polyester resins is performed, the various troubles caused by the high shrinkage of the uncured unsaturated polyester resin, as mentioned above, cannot be obviated. These difficulties would be overcome if a thickner and a reinforcing material are incorporated into an uncured unsaturated polyester resin composition containing a thermoplastic resin as a shrinkage-improving polymer to form a prepreg mat, SMC or BMC. However, the resulting composition suffers from the low dispersion stability of the shrinkage-improving polymer in the composition during its storage for long periods of time. This defect of low dispersion stability, or the poor storage stability of the composition, means that the dispersed state of the shrinkage-improving polymer in the thickened composition becomes poor during the storage of the prepreg mat, SMC or BMC. In other words, it means that a solution of the shrinkage-improving polymer in a crosslinking monomer (for example, styrene) present in the composition agglomerates to form coarse particles, or exudes onto the surface of the prepreg, SMC or BMC. If such a prepreg mat, SMC or BMC is molded using a mold, the shrinkage-improving polymer adheres to the surface of the mold, and the surface of the cured molded product has poor luster and smoothness and at times, suffers from colored spots. Furthermore, since the surface of such a prepreg mat, SMC or BMC becomes tacky, the working efficiency is reduced. The problem of dispersion stability of the composition containing a thickner does not matter much in the case of the composition containing no thickner.

There has been proposed a method in an attempt to reduce the shrinkage of the thickened composition and overcome the problem of poor dispersion stability, which method involves the use of, as the shrinkage-improving polymer, a carboxyl-containing thermoplastic resin (such as a copolymer of methyl methacrylate and acrylic acid) which is soluble either in a crosslinking monomer such as styrene or an uncured unsaturated polyester resin. This method has contributed to some extent to the improvement of the dispersion stability and the prevention of shrinkage at the time of molding, but has not proved entirely satisfactory. Especially, this method cannot give a cured molded article having satisfactory surface smoothness.

It is an object of this invention to provide an uncured unsaturated resin composition which is free from the above-mentioned defects of the conventional uncured unsaturated polyester resins and useful in the production of a cured unsaturated polyester resin molded article.

According to the present invention, there is provided a composition that can be used especially preferably as an uncured unsaturated polyester resin component in the preparation of a starting material for producing a reinforced cured unsaturated polyester resin molded article, which comprises the uncured unsaturated polyester resin, a thickner and reinforcing fibers, such as a prepeg mat, SMC or BMC. By using the composition of this invention as the uncured unsaturated polyester resin component, there can be produced a prepreg mat, SMC or BMC capable of giving a smooth lustrous reinforced cured article, which has good storage stability, reduced shrinkage during curing, and no tendency to the adhesion to the mold, and does not cause sink marks at the rib and boss portions of the mold.

One type of the uncured unsaturated polyester resin composition in accordance with this invention comprises (1) 60 to 97 % by weight of an uncured unsaturated polyester resin which is a liquid mixture of at least one unsaturated polyester and at least one unsaturated monomer for curing the polyester, and (2) 40 to 3 % by weight of a modifying polymer of microgel structure which is obtained by polymerizing 97 to 30 % by weight of at least one radial polymerizable monomer in the presence of 3 to 70 % by weight of at least one rubbery polymer having double bonds in the molecule, is finely dispersible, without dissolving, in both of said unsaturated polyester resin and an unsaturated monomer for curing the polyester, and contains 0.1 to 10 % by weight of carboxyl groups in the molecule.

Another type of the uncured unsaturated polyester resin composition in accordance with this invention comprises (1) 60 to 97 % by weight of an unsaturated polyester resin which is a liquid mixture of at least one unsaturated polyester and at least one unsaturated monomer for curing the polyester, and (2) 40 to 3 % by weight of a combined modifying polymer component which comprises (a) 80 to 5 % by weight of a polymer of microgel structure which is obtained by polymerizing 97 to 30 % by weight of at least one radical polymerizable monomer in the presence of 3 to 70 % by weight of at least one rubbery polymer having double bonds in the molecule, and is finely dispersible, without dissolving, in both of said unsaturated polyester resin and an unsaturated monomer for curing the polyester, and (b) 20 to 95 % by weight of at least one thermoplastic polymer soluble in at least one of said unsaturated polyester resin and unsaturated monomer for curing the polyester, at least one of the polymers (a) and (b) containing carboxyl groups in the molecule, the total amount of said cafboxyl groups being 0.1 to 10 % by weight based on the total weight of the polymers (a) and (b).

The above compositions in accordance with this invention contribute to the effective achievement of the object of this invention. The second type is more preferred for various advantages to be described hereinafter.

The modifying polymers of microgel structure which constitute component (2) are important ingredients the present invention. The other components, that is, the unsaturated polyesters, unsaturated monomers for curing the polyester and the uncured unsaturated polyester resins each of which is a liquid mixture of at least one unsaturated polyester and at least one unsaturated monomer for curing the polyester and the polymers soluble in the uncured unsaturated polyester resins have been known previously. Also, the thickener, reinforcing fibers, filler, curing catalyst, and other additives have previously been known. All of these known components and additives can be used in the present invention. It is to be understood therefore that the description of these known components and additives in the present specification is for the purpose of illustration only, and does not in any way limit the present invention.

The unsaturated polyester is produced by a known method such as the melting method, the solution method or the epoxy method using an $\alpha,\beta$-unsaturated dibasic acid and a glycol together, if desired, with an aromatic saturated dibasic acid or an aliphatic saturated dibasic acid. Examples of the $\alpha,\beta$-unsaturated dibasic acid are maleic anhydride, maleic acid, fumaric acid, mesaconic acid, tetraconic acid, itaconic acid, chlorinated maleic acid, and dimethyl esters of these acids. Examples of the glycol are ethylene glycol, diethylene glycol, propylene glycol, dipropylene glycol, butylene glycol, neopentyl glycol, hexylene glycol, hydrogenated bisphenol A, 2,2'-di(4-hydroxypropoxyphenol) propane, and 2,2'-di(4-hydroxyethoxyphenyl) propane. In addition to these glycols, ethylene oxide and propylene oxide are also useful.

The aromatic saturated dibasic acid may, for example, be phthalic acid, phthalic anhydride, isophthalic acid, terephthalic acid, tetrahydrophthalic acid, halogenated phthalic anhydride, and dimethyl esters of these acids. The acid component contains the $\alpha,\beta$-unsaturated dibasic acid in an amount of 50 to 100 mol%. If the amount is less than 50 mol%, the effect of reducing the shrinkage is not satisfactory.

The unsaturated polyester preferably has a molecular weight in the range of 1,000 to 3,000, an acid value of 5 to 50 and a hydroxyl value of 5 to 60.

The crosslinking unsaturated monomer to be used in admixture with the unsaturated polyester may be any monomer having radical polymerizability with the unsaturated polyester. Examples include styrene, vinyl toluene, chlorostyrene, divinyl benzene, t-butyl styrene, vinyl acetate, diallyl phthalate, acrylic acid esters, and methacrylic acid esters. Of these, the styrene type unsaturated monomers are preferred. The mixing proportions of the unsaturated polyester and the crosslinking unsaturated monomer are 30 to 80 % by weight for the former and 20 to 70% by weight for the latter. The resulting mixture is a liquid and is generally called an uncured unsaturated polyester resin.

Usually known thickeners for the uncured unsaturated polyester resin include oxides or hydroxides of alkaline earth metals such as magnesium oxide, magnesium hydroxide or calcium hydroxide (together with calcium oxide, if desired). The amount of the thickner is suitably 0.2 to 10 parts by weight per 100 parts by weight of a mixture of the uncured unsaturated polyester resin and the shrinkage-improving polymer.

The polymeric material of the microgel structure which contains a carboxyl group in the molecule is present as very stable finely dispersed particles in the uncured unsaturated polyester resin composition. Accordingly, the polymeric material does not agglomerate, nor exudes onto the surface of the composition during storage. Furthermore, because of the microgel structure, this polymeric substance does not melt by heating. Accordingly, no phase separation of the polymer occurs as a result of the melt-adhesion of the dispersed particles of the polymer to each other at the time of curing and molding the composition containing this polymer. Thus, by curing and molding the composition in a mold, a sufficient effect of reducing the shrinkage of the uncured unsaturated polyester resin is exhibited, and there can be obtained a smooth and lustrous cured shaped article free from defects such as cracks, sink marks or projections of the reinforcing fibers.

A mixture of the polymeric material having a microgel structure and the unsaturated polyester resin has a considerably high viscosity, and a composition consisting of this mixture and a filler such as calcium carbonate has a higher viscosity. This may lead to insufficient impregnation of the composition into the reinforcing fibers when producing a prepreg mat or SMC containing a relatively large amount of a filler, and sometimes, a satisfactory cured shaped article cannot be obtained. If a combined modifying polymer consisting of the polymer of microgel structure and a soluble polymer to be described below is added to the uncured unsaturated polyester resin as in the composition of the second type, the impregnation of the composition into the reinforcing fibers is improved, and the above-mentioned difficulty can be overcome. It is essential that one or both of the polymer of the microgel structure and the soluble polymer should contain a carboxyl group. Such an effect is exhibited when the polymer of the microgel structure and the soluble polymer are used conjointly. When the soluble polymer alone is mixed with the unsaturated polyester resin, the viscosity of the mixture can be rendered relatively low and the impregnatability of the mixture into the reinforcing fibers. However, the effect of reducing the shrinkage is poor, and the dispersion stability of the soluble polymer in SMC or BMC is insufficient. Accordingly, the dispersed particles agglomerate into a large mass during storage, and causes a macroscopic phase separation. Such a mass adheres to a mold during shaping to cause the loss of luster of the molded article. It is difficult therefore to obtain a prepreg mat, SMC or BMC of low shrinkage.

The polymer of the microgel structure used in this invention can be formed by polymerizing 97 to 30 % by weight of at least one radical polymerizable monomer in the presence of 3 to 70 % by weight of at least one rubbery substance having double bonds in the molecule, for example according to the emulsion polymerization or the suspension polymerization. In order to obtain a microgel polymer containing a carboxyl group, either one or both of the rubbery substance and the polymerizable monomer used in the above-mentioned polymerization process should contain a carboxyl group. Because of the presence of the rubbery substance, this polymer is structurally heterogeneous, and often contains a slight degree of crosslinking structure, and therefore, it can be dispersed in the unsaturated polyester resin and the crosslinking monomer as fine particles without dissolving.

The rubbery polymer used for the production of the microgel polymer may be any rubbery polymer having double bonds on the main chain and/or side chains of the molecule. Such a rubbery polymer includes rubbery polymers of the butadiene, isoprene, chloroprene and acrylic ester types and an ethylene/propylene/nonconjugated diene rubber. Specific examples are polybutadiene, a butadiene/styrene copolymer, a butadiene/acrylonitrile copolymer, a butadiene/an acrylic ester copolymer, a butadiene/a methacrylic ester copolymer, a butadiene/acrylic acid copolymer, a butadiene/methacrylic acid copolymer, a butadiene/an acrylic ester/acrylic acid terpolymer, a butadiene/a methacrylic ester/acrylic acid terpolymer, polyisoprene, an isoprene/styrene copolymer, chloroprene, natural rubber, an acrylic ester/allyl methacrylate copolymer, and an ethylene/propylene/norbornene terpolymer.

The monomer to be polymerized in the presence of the rubber polymer for preparing a polymer of the microgel structure may be any radical polymerizable monomer. However, the modifying polymer component or the combined modifying polymer component should contain a carboxyl group in an amount of preferably 0.1 to 10 % by weight. Accordingly, according to the presence or absence of a carboxyl group in the rubbery polymer or its content, a radical polymerizable monomer which contains or does not contain a carboxyl group is properly chosen. Examples of the radical polymerizable monomer containing no carboxyl group are acrylic esters such as methyl acrylate, ethyl acrylate, butyl acrylate or hexyl acrylate, methacrylic esters such as methyl methacrylate, ethyl methacrylate, butyl methacrylate or hexyl methacrylate, vinyl esters such as vinyl acetate or vinyl propionate, aromatic vinyl compounds such as styrene, α-methylstyrene or orthovinyl toluene, α-olefins, diolefins, vinyl chloride, vinylidene chloride, and acrylonitrile. If desired, it is possible to use conjointly a bifunctional or higher polymerizable monomer such as divinyl benzene or triallyl cyanurate. Of these, the methacrylic esters and the aromatic vinyl compounds are especially preferred.

Examples of the radical polymerizable monomer containing a carboxyl group are acrylic acid, methacrylic acid, crotonic acid, maleic acid, monomethyl maleate, monobutyl maleate, fumaric acid, itaconic acid, and p-vinyl benzoic acid, which are α,β-unsaturated carboxylic acids.

The most preferred polymers of the microgel structure for use in the present invention are those obtained by copolymerizing α,β-unsaturated carboxylic acids with at least one of styrene, methyl methacrylate and acrylonitrile in the presence of polybutadiene or polyisoprene.

It has previously been known that the component (b), that is, the thermoplastic polymer soluble in the uncured unsaturated polyester resin and/or the unsaturated monomer for curing the polyester, which is used in the second type composition is used alone as a modifying polymer. Examples of such a thermoplastic polymer are those obtained by polymerizing or copolymerizing polymerizable monomers selected from the group consisting of aromatic vinyls such as styrene, acrylic esters, methacrylic esters, α-olefins, diolefins, vinyl esters such as vinyl acetate, vinyl chloride, vinylidene chloride acryl nitrile and methacrylonitrile; cellulose derivatives; and saturated polyesters. These polymers have a molecular weight of 1,500 to 10,000,000. Where a carboxyl-containing soluble polymer is desired, the introduction of a carboxyl group can be performed by various chemical reactions such as graft polymerization after the formation of the polymer. However, most suitably, a carboxylcontaining monomer is incorporated and copolymerized at the time of forming the polymer.

The soluble polymer can also be formed as a byproduct in the production of the polymer of the microgel structure by controlling the polymerization conditions properly. According to this method, a mixture of the microgel polymer and the soluble polymer can be obtained. The use of a rubbery substance containing no crosslinkage or containing only a slight degree of crosslinkage and the use of a polymerization regulating agent in a relatively large amount are the effective means of achieving this end.

Desirably, the mixing proportions of component (a) (microgel polymer) and component (b) (soluble polymer) in the combined modifying polymer are 80–5 % by weight, and 20–95 % by weight, respectively.

The weight ratio of the unsaturated polyester resin to the modifying polymer or the combined modifying polymer in the composition of this invention is 60:40 to 97:3, preferably 75:25 to 95:5. If the ratio of the modifying polymer or the combined modifying polymer is lower than this specified range, the effect of reducing the shrinkage is not sufficient, and if it is higher than this range, the properties of the cured product, such as strength or hardness, are deteriorated.

In order to form the composition of this invention, the modifying polymer or the combined modifying polymer component can be admixed with the uncured unsaturated polyester resin, either as such or as a dispersion or solution in an unsaturated monomer for curing the unsaturated polyester. When the soluble polymer is added, it is especially preferred to add it in the form dissolved in the monomer for curing the unsaturated polyester. The monomer used to dissolve or disperse the modifying polymer component is the same as the monomer contained in the unsaturated polyester to cure it or a monomer copolymerizable with it. The amount of this monomer is determined as the monomer contained in the unsaturated polyester resin for curing it.

It has been found that when a polymer containing a polar group inaddition to the carboxyl group is used as the modifying polymer or the combined modifying polymer is used, the final cured product obtained has improved adhesion to a coating composition to be applied to the surface of the cured article. Examples of such a polar group are —OH, —COOR, —CONH—, —CN, and halogens. Where a combined modifying polymer consisting of the microgel polymer and the soluble polymer is used, at least one of them should contain the above-mentioned polar group. The preparation of such a modifying polymer may be effected by polymerizing the monomer in the presence of a polymerizable monomer containing the polar group. Examples of such a polymerizable monomer are acrylic esters, methacrylic esters, vinyl esters, acrylamides, vinyl chloride, vinylidene chloride, acrylonitrile, and methacrylonitrile.

A prepreg mat, SMC or BMC of superior quality can be prepared by incorporating a filler, a curing catalyst, a mold releasing agent, a coloring agent, an ultraviolet absorbent, or other additives into the resin composition of this invention before its viscosity becomes high as a result of mixing a thickner therewith, and impregnating the blend into a reinforcing fibrous mat or fibrous laminate, or mixing it with reinforcing fibers of short cut lengths. Generally, the reinforcing fibers are glass fibers, but polyvinyl alcohol fibers, carbon fibers, etc. can also be used. Useful fillers are calcium carbonate, barium sulfate, and kaolin, and the amount of the filler is 50 to 200 parts per 100 parts of the unsaturated polyester resin composition. The curing catalyst is not a special one, and any conventional curing catalysts for premixes or prepreg mats can be used. Examples of the curing catalyst are dicumyl peroxide, t-butyl perbenzoate, di-t-butyl hydroperoxide, t-butyl peroctate, 2,5-dimethyl-2,5-di(t-butyl peroxy) hexane, and 2,5-dimethyl hexyl-2,5-di-(peroxybenzoate). Stabilizers may be hydroquinone, p-benzoquinone, naphthoquinone, phenanthraquinone, t-butyl catechol and mono-t-butyl hydroquinone. Other additives such as a coloring agent, a mold releasing agent or an ultraviolet absorbent, may be those conventionally used for plastics.

The curing temperature for the composition of this invention is suitably 80° to 180°C. If the temperature is lower than it, the effect of reducing the shrinkage cannot be exhibited.

The invention will be described in greater detail by the following Examples in which all parts and percentages are by weight unless otherwise specified. The various properties shown in the Examples were measured in accordance with the following methods.

1. Solubility of the Modifying Polymer 10 parts of a modifying polymer (for example, a polymer of the microgel structure) was well mixed with 90 parts of a monomer for curing the polyester (for example, styrene). The mixture was subjected to centrifugal separation for 20 minutes at a speed of 7,000 revolutions per minute. Then, the mixture was examined for the presence of the insoluble part precipitated.

2. Impregnatability of the Composition in Glass Fibers

The state of impregnation was observed by the naked eye, and evaluated on a scale of "good" and "poor".

3. Surface Smoothness of the Cured Molded Article

The smoothness of the surface of the molded article was measured using a microcorder. The furnace given are the microinches of the surface roughness determined by scanning 1 inch. Smaller figures show better surface smoothness. It was also evaluated on a scale of "good," "fair," "poor" and "inferior."

4. Stability of SMC

An SMC which was stored at room temperature for a prescribed period after production was evaluated on the basis of the following standard.

| Evaluation | State of SMC |
| --- | --- |
| Good | No surface tackiness; the polymer does not exude onto the surface even when a modifying polymer is mixed |
| Fair | Surface slightly tacky; the modifying polymer exudes onto the surface to a slight extent |
| Inferior | Surface very tacky; the modifying polymer exudes onto the surface |

5. Adhesion of Paint

A test piece of the cured molded article was coated with a paint in a thickness of 40 microns, and 100 crosscuts of 1 mm width were provided longitudinally and transversely on the test piece up to the surface of the original tst piece. An adhesive tape was applied to the entire surface of the test piece, and pulled off by hand. The number of the crosscuts removed was measured. The adhesion of the paint was evaluated on the following scale.

| Evaluation | Number of the crosscuts removed |
|---|---|
| Good | 0 to 5 |
| Fair | 5 to 20 |
| Inferior | 20 to 100 |

EXAMPLE 1

1. Preparation of Unsaturated Polyester Resin

A glass reaction vessel equipped with a stirrer, a gas flow inlet, a condenser and a thermometer was charged with 1.5 mols of maleic anhydride, 0.5 mol of phthalic anhydride and 2.05 moles of propylene glycol, and they were reacted for 10 hours at 200°C. in a stream of nitrogen to form an unsaturated polyester having an acid value of 43. 70 parts of the unsaturated polyester was dissolved in 30 parts of styrene to form an unsaturated polyester resin (UP-1).

2. Preparation of Microgel Polymer

A glass reaction vessel equipped with a stirrer, a thermometer, a gas flow inlet tube and a condenser was charged with 17 parts, as solid content, of polybutadiene latex, 80 parts of methyl methacrylate and 3 parts of methacrylic acid. The mixture was diluted with 180 parts of water, and sodium dodecylbenzenesulfonate (emulsifier), lauryl mercaptan (polymerization regulator) and potassium persulfate (catalyst) were added. These the above materials were reacted for 6 hours in a nitrogen atmosphere at 60°C. The produt was salted out, washed, and dried to form a polymer (G-1) of the microgel structure having a carboxyl content of 1.7 %. This polymer was insoluble in a monomer, such as styrene, vinyl toluene or methyl methacrylate, for curing the unsaturated polyester resin. 10 parts of this polymer (G-1) was mixed with 90 parts of styrene, and the mixture was subjected to centrifugal separation for 20 minutes at a speed of 7,000 revolutions per minute. The proportion of the precipitated portion was 93 %. This polymer (G-1) was neither soluble in UP-1.

A powdery polymer (G-2) was also produced by the same procedure as above using 20 parts, as solids content, of a polybutadiene latex, 12 parts of methyl methacrylate, 65 parts of styrene, 3 parts of acrylic acid, 180 parts of ion exchanged water, 3.0 parts of GAFAC-RE 610 (emulsifier based on alkyl polyethyleneoxyphosphate, product of Toho Kagaku Kabushiki Kaisha), and 1.5 parts of potassium persulfate catalyst. This polymer had a carboxyl content of 1.9 %. The polymer (G-2) was not uniformly soluble in a monomer, such as styrene, vinyl toluene, or methyl methacrylate, for curing the unsaturated polyester. 10 parts of the polymer G-2 was mixed with 90 parts of styrene, and the mixture was subjected to centrifugal separation for 20 minutes at a speed of 7,000 revolutions per minute. The proportion of the precipitated portion was about 90 %. The G-2 was not soluble in UP-1.

3. Preparation of SMC

A sheet molding compound was prepared in accordance with the following recipe.

| | | |
|---|---|---|
| Unsaturated polyester resin (UP-1) | 58 | parts |
| Microgel polymer (G-1) or (G-2) | 12 | |
| Styrene | 30 | |
| Zinc stearate | 4 | |
| t-Butyl perbenzoate | 1.5 | |
| p-Benzoquinone | 0.03 | |
| Calcium carbonate | 110 | |
| Magnesium oxide | 1.2 | |
| Chopped strand glass fibers (fiber length 2 inches) | 95 | |

The resulting sheet molding compound was stable during storage for 3 months. The styrene solution of the polymer G-1 did not exude on the surface of the sheet molding compound, and the surface did not become tacky.

After allowing the sheet molding compound to stand for 10 days at room temperature, it was molded using a matched metal die at molding temperature of 140°C. under a molding pressure of 200 kg/cm$^2$. The molded product was free from sink marks, and had superior surface smoothness. The properties of the molded product were measured, and the results are shown in Table 1.

In order to show the superior properties of the composition of this invention more clearly, Controls 1 to 5 were performed in the same way as in Example 1 except as noted below.

Control 1

42 parts of the unsaturated polyester resin (UP-1) was used instead of 12 parts of the microgel polymer G-1 and 30 parts of styrene in Example 1, (3). (The total amount of UP-1 was 100 parts.)

Control 2

Poly(methyl methacrylate) was used instead of the microgel polymer G-1 in Example 1, (3).

Control 3

A copolymer prepared from 96 parts of methyl methacrylate and 4 parts of acrylic acid was used instead of the microgel polymer G-1 in Example 1, (3).

Control 4

Polystyrene was used instead of the microgel polymer G-1 in Example 1, (3).

Control 5

Instead of the microgel polymer G-1 in Example 1, (3), a carboxyl-free polymer (G'-1) obtained by polymerizing 17 parts, as solids content, of a polybutaiene latex and 83 parts of methyl methacrylate in the same way as in Example 1, (2) was used.

Table 1

| Runs Nos. | Modifying Polymer | Carboxyl content of the modifying Polymer (wt.%) | Solubility of the modifying polymer in styrene | Stability of SMC | Surface smoothness of the molded product (*) | Adhesion of paint |
|---|---|---|---|---|---|---|
| 1 | G-1 | 1.7 | Insoluble (dispersed finely) | Good | Good 120 | Good |
| 2 | G-2 | 1.9 | Insoluble (dispersed finely) | Good | Good 150 | Fair |

Table 1—Continued

| Runs Nos. | Modifying Polymer | Carboxyl content of the modifying Polymer (wt.%) | Solubility of the modifying polymer in styrene | Stability of SMC | Surface smoothness of the molded product (*) | Adhesion of paint |
|---|---|---|---|---|---|---|
| Control 1 | None | 0 | — | Good | Inferior 2300 | Good |
| Control 2 | Poly(methyl methacrylate) | 0 | Soluble | Inferior | Poor 500 | Fair |
| Control 3 | Copolymer of 96 parts of methyl methacrylate and 4 parts of acrylic acid | 2.4 | Soluble | Fair | Fair 380 | Good |
| Control 4 | Polystyrene | 0 | Soluble | Inferior | Poor 700 | Inferior |
| Control 5 | G'-1 | 0 | Insoluble (finely dispersed) | Fair | Fair 200 | Good |

The surface smoothness of the molded product obtained from SMC which had been allowed to stand for 10 days after preparation.

EXAMPLE 2

A bulk molding compound was produced in accordance with the following receipe.

| | |
|---|---|
| Unsaturated polyester resin (UP-1) | 65 parts |
| Microgel polymer (G-1) or (G-2) | 10 |
| Styrene | 25 |
| Zinc stearate | 4 |
| t-Butyl perbenzoate | 1.5 |
| p-Benzoquinone | 0.02 |
| Magnesium oxide | 1.2 |
| Calcium carbonate | 140 |
| Chopped strand glass fibers (¼ inch) | 60 |

The resulting bulk molding compound (BMC) was stable during storage for 3 months.

After the BMC was allowed to stand at room temperature for 10 days after preparation, it was injection molded at 140°C. and injection pressure of 110 Kg/cm².

Controls 6 to 10 were performed in the same way as in Example 2 as noted below.

Control 6

36 parts of the unsaturated polyester resin (UP-1) was used instead of 10 parts of G-1 and 25 parts of styrene in Example 2.

Control 7

Polymethyl (methacrylate) was used intead of G-1 in Example 2

Control 8

A copolymer prepared from 96 parts of methyl methacrylate and 4 parts of acrylic acid was used instead of G-1 in Example 2.

Control 9

Polystyrene was used instead of G-1 in Example 2.

Control 10

G'-1 used in Control 5 was used instead of G-1 in Example 2.

Table 2

| Runs Nos. | Modifying polymer | Stability of BMC | Surface smoothness of the molded product (*) | Adhesion of paint |
|---|---|---|---|---|
| 1 | G-1 | Good | Good 130 | Good |
| 2 | G-2 | Good | Good 130 | Fair |
| Control 6 | None | Good | Inferior 2000 | Good |
| Control 7 | Polymethyl (methacrylate) | Inferior | Poor 450 | Fair |
| Control 8 | Copolymer of 96 parts methyl methacrylate and 4 parts of acrylic acid | Fair | Fair 350 | Good |
| Control 9 | Polystyrene | Inferior | Poor 700 | Inferior |
| Control 10 | G'-1 | Fair | Fair 200 | Good |

(*)The surface smoothness of a molded product obtained from BMC which had been allowed to stand for 10 days after preparation.

EXAMPLES 3 TO 13

These Examples show the effect of adding various polymers of the microgel mixture to an unsaturated polyester resin.

1. Preparation of Unsaturated Polyester Resin

An unsaturated polyester having an acid value of 38 was prepared in the same way as in Example 1 from 1.0 mol of maleic anhydride, and 1.05 mols of propylene glycol, and 70 parts of the unsaturated polyester was mixed with 30 parts of styrene to produce an unsaturated polyester resin (UP-2).

2. Preparation of Sheet Molding Compound (SMC)

A sheet molding compound (SMC) was prepared from in accordance with the following recipe, and molded in the same way as in Example 1.

| | | |
|---|---|---|
| Unsaturated Polyester resin (UP-2) | 65 | parts |
| Microgel polymer | 12 | |
| styrene | 23 | |
| Zinc stearate | 4 | |
| t-Butyl perberzoate | 1.5 | |
| p-Benzoquinone | 0.02 | |
| Calcium carbonate | 120 | |
| Magnesium oxide | 1.3 | |
| Chopped strand of glass fibers (fiber length 2 inches) | 90 | |

3. Preparation of Microgel Polymer

Using the rubbery substances and polymerizable monomers indicated in Table 3, polymers of the microgel structures were produced by the same method as in Example 1-(2). All of the polymers obtained were insoluble in styrene, and were dispersed finely.

The results of tests on the SMC and molded product are shown in Table 4.

Controls 11 and 12 were also performed in the same way as in Examples 3 to 9 except as noted below.

Control 11

In Examples 3 to 13, G'-1 was used instead of the microgel polymer.

Control 12

In Examples 3 to 13, 32 parts of the unsaturated polyester resin (UP-2) was used instead of the microgel polymer.

EXAMPLES 14 TO 18

These Examples will illustrate the effect of adding the microgel polymer to various unsaturated polyesters.

1. Preparation of Sheet Molding Compound (SMC)

A sheet molding compound was prepared in accordance with the following recipe.

| | | |
|---|---|---|
| Unsaturated polyester | 64 | parts |
| Polymer G-3 | 10 | |
| Sytrene | 26 | |
| Zinc stearate | 4 | |
| t-Butyl perbenzoate | 1.5 | |
| p-Benzoquinone | 0.02 | |
| Calcium carbonate | 120 | |
| Magnesium oxide | 1.5 | |
| Chopped strand of glass fibers (fiber length 1 inch) | 90 | |

2. Preparation of the Unsaturated Polyester Resin

The unsaturated polyester resins used in these Examples were prepared by the same procedure as in Example 1, (1) in accordance with the following recipe.

| Unsaturated polyester resin (UP-3) of Example 14 | |
|---|---|
| Maleic anhydride | 1.75 mols |
| Isophthalic acid | 0.25 mol |
| Propylene glycol | 2.05 mols |
| Acid value | 42 |
| Styrene | 30% by weight |
| Unsaturated polyester resin (UP-4) of Example 15 | |
| Maleic anhydride | 1.0 mol |
| Phthalic anhydride | 1.0 mol |
| Propylene glycol | 2.05 mols |
| Acid value | 45 |
| Styrene | 30% by weight |

Table 3

| Run Nos. | Polymer having a microgel structure COOH Content (wt.%) | Types | Rubbery substance (parts) | | Polymerizable monomors (parts) | | | | | |
|---|---|---|---|---|---|---|---|---|---|---|
| | | | Poly-butadiene | Styrene-butadiene copolymer | Styrene | Acrylo-nitrile | Methyl meth-acrylate | Ethyl acrylate | Acrylic acid | Meth-acrylic acid |
| 3 | 2.0 | G-3 | 21 | — | 17 | — | 58 | — | — | 4 |
| 4 | 1.9 | G-4 | 21 | — | 44 | — | 32 | — | 3 | — |
| 5 | 2.9 | G-5 | 15 | — | 18 | — | — | 62 | 5 | — |
| 6 | 1.5 | G-6 | 10 | — | 24 | 25 | 38 | — | 3 | — |
| 7 | 1.1 | G-7 | 6 | — | 15 | — | 77 | — | — | 2 |
| 8 | 1.8 | G-8 | — | 30 | 29 | — | 38 | — | 3 | — |
| 9 | 2.1 | G-9 | — | 15 | 46 | — | 35 | — | — | 4 |
| 10 | 2.5 | G-10 | 20 | — | 76 | — | — | — | 4 | — |
| 11 | 1.4 | G-11 | 10 | — | 69 | 14 | 3 | — | — | 4 |
| 12 | 2.1 | G-12 | — | 20 | 63 | — | 13 | — | — | 4 |
| 13 | 1.3 | G-13 | — | 40 | 35 | — | 23 | — | 2 | — |

Table 4

| Run Nos. | Modifying polymer | Solubility of the modifying polymer in styrene | Stability of SMC | Surface smoothness of the molded article (*) | Adhesion of paint |
|---|---|---|---|---|---|
| 3 | G-3 | Insoluble (finely dispersed) | Good | Good 120 | Good |
| 4 | G-4 | " | Good | Good 130 | Good |
| 5 | G-5 | " | Good | Good 130 | Good |
| 6 | G-6 | " | Good | Good 140 | Good |
| 7 | G-7 | " | Good | Good 145 | Good |
| 8 | G-8 | " | Good | Good 140 | Good |
| 9 | G-9 | " | Good | Good 155 | Good |
| 10 | G-10 | " | Good | Good 130 | Fair |
| 11 | G-11 | " | Good | Good 145 | Fair |
| 12 | G-12 | " | Good | Good 140 | Fair |
| 13 | G-13 | " | Good | Good 130 | Fair |
| Control 11 | G'-1 | " | Fair | Fair 280 | Good |
| Control 12 | None | | Good | Inferior 2200 | Good |

(*)The surface smoothness of a molded article obtained from a sheet molding compound which had been allowed to stand for 10 days after its preparation.

―Continued

Unsaturated polyester resin (UP-5)
of Example 16

| | |
|---|---|
| Maleic anhydride | 1.0 mol |
| 2,2'-di-(4-hydroxypropoxy-phenyl) propane | 1.0 mol |
| Acid value | 46 |
| Styrene | 35% by weight |

Unsaturated polyester resin (UP-6)
of Example 17

| | |
|---|---|
| Maleic anhydride | 0.8 mol |
| Phthalic anhydride | 0.2 mol |
| 1,3-Butanediol | 1.02 mols |
| Acid value | 43 |
| Styrene | 30% by weight |

Unsaturated polyester resin (UP-7)
of Example 18

| | |
|---|---|
| Maleic anhydride | 1.0 mol |
| Diethylene glycol | 1.02 mols |
| Acid value | 38 |
| Styrene | 32% by weight |

After allowing the resulting SMC to stand for 10 days, it was molded, and the properties of the molded article were measured. The results are shown in Table 5.

Table 5

| Examples | Unsaturated polyester resin | Stability of SMC | Surface smoothness of the molded article (*) | Adhesion of paint |
|---|---|---|---|---|
| 14 | UP-3 | Good | Good 120 | Good |
| 15 | UP-4 | Good | Good 190 | Good |
| 16 | UP-5 | Good | Good 170 | Good |
| 17 | UP-6 | Good | Good 145 | Good |
| 18 | UP-7 | Good | Good 135 | Good |

(*)The surface smoothness of a molded article obtained from SMC which has been allowed to stand for 10 days after its preparation.

EXAMPLE 19

1. Unsaturated Polyester Resin
UP-1 was used.

2. Polymer having a Microgel Structure

Either G-2 or G-14 was used. G-14 was a powdery polymer obtained by the method of Example 1, (2) using 35 parts, as solids content, of a polybutadiene latex, 65 parts of styrene, 180 parts of ion exchanged water, 3.0 parts of sodium dodecylbenzenesulfonate and 1.5 parts of potassium persulfate. G-14 was not uniformly soluble in a monomer for curing an unsaturated polyester resin, such as styrene vinyl toluene or methyl methacrylate. 10 parts of G-14 was mixed with 90 parts of styrene, and the mixture was subjected to centrifugal separation at a speed of 7000 revolutions per minute for 20 minutes. The amount of the precipitated portion was about 90 % by weight. G-14 was neither soluble in UP-1.

3. Preparation of Soluble Polymer

A carboxyl-containing polymer (S-1) having a molecular weight of about 50,000 was prepared from 97 parts of methyl methacrylate and 3 parts of acrylic acid. S-1 was soluble in styrene, methyl methacrylate, and vinyl toluene, and had a carboxyl content of 1.8 % by weight.

4. Preparation of Sheet Molding Compound (SMC)

SMC was prepared in accordance with the following recipe.

| | No.1 (parts) | No.2 (parts) |
|---|---|---|
| Unsaturated polyester resin (UP-1) | 58 | 58 |
| Microgel polymer | G-2 (7) | G-14 (7) |
| Soluble polymer (S-1) | 5 | 5 |
| Styrene | 30 | 30 |
| Zinc stearate | 4 | 4 |
| t-Butyl perbenzoate | 1.5 | 1.5 |
| t-Butyl catechol | 0.04 | 0.04 |
| Magnesium oxide | 1.2 | 1.2 |
| Calcium carbonate | 110 | 110 |
| Chopped strand of glass fibers (fiber length 2 inches) | 95 | 95 |

The SMC so produced was stable during storage for 3 months, and its surface did not become tacky. The resulting SMC was stored at room temperature for 5 days, 10 days, 20 days and 30 days after its preparation, and molded at a temperature of 140°C. and a pressure of 200kg/cm² with a molding cycle of 3 minutes. The properties of the molded articles are given in Table 6.

In order to clarify the superior advantages of this invention, some control examples were performed. In each of the controls, the procedure of Example 19 was followed except as noted below.

Control 13

42 parts of UP-1 (the total amount UP-1 was 100 parts) was used instead of 7 parts of G-2, 5 parts of S-1 and 30 parts of styrene in Example 19, No. 1, (4).

Control 14

Instead of 7 parts of G-2 in Example 19, No. 1, (4), 7 parts of S-1 was used (the total amount of S-1 was 12 parts).

Control 15

In Example 19, No. 2, (4), 5 parts of G-14 was used instead of 5 parts of S-1 (the total amount of G-14 was 12 parts).

For reference, the viscosity of a resin composition containing no thickner and glass fibers was measured during the production of SMC. The impregnatability of the resin composition in the glass fibers at the time of producing SMC was observed, and the results shown in Table 6 were obtained.

Generally when the viscosity of the resin composition before addition of a thickner is too high, the impregnatability of the resin composition is poor. In Control 15, the viscosity of the resin composition is poor. However, in the case of No. 2 containing G-14 and S-1 and No. 1 containing G-2 and S-1, the viscosity was unexpectedly low, and the impregnatability was good.

Table 6

| Runs Nos. | Modifying polymer | COOH content of the modifying polymer (% by weight) | Solubility of the polymer | Viscosity of the composition containing thickner and glass fibers | Impregnability in glass fibers | Stability of SMC — Number of days of storage of SMC |  |  |  | Surface smoothness of molded articles — Number of days of storage of SMC |  |  |  | Flexural strength of the molded article (kg/mm²) | Overall evaluations |
|---|---|---|---|---|---|---|---|---|---|---|---|---|---|---|---|
| | | | | | | 5 | 10 | 20 | 30 | 5 | 10 | 20 | 30 | | |
| 1 | Mixture of S-1 and G-3 | 1.4 | Partly insoluble (dispersed finely), partly soluble | 300 | Fair | Good | Good | Good | Good | Good 160 | Good 180 | Good 200 | Good 230 | 18 | Good |
| 2 | Mixture of G-1 and G-14 | 0.8 | ditto | 350 | Fair | Good | Good | Good | Good | Good 150 | Good 150 | Good 180 | Good 200 | 16 | Good |
| Control 13 | None | 0 | — | 160 | Fair | Good | Good | Good | Good | Inferior 2300 | Inferior 2300 | Inferior 2300 | Inferior 2306 | 25 | Poor |
| Control 14 | S-1 | 1.8 | Soluble | 200 | Fair | Good | Fair | Inferior | Inferior | Good 200 | Fair 370 | Poor 500 | Poor 800 | 17 | Poor |
| Control 15 | G-14 | 0 | Insoluble (finely dispersed) | 900 | Inferior | Good | Good | Good | Good | Good 200 | Good 200 | Good 200 | Good 200 | 12 | Poor |

EXAMPLES 20 TO 43

These Examples will illustrate the effects of various modifying polymer mixtures on the unsaturated polyester resin.

1. Unsaturated Polyester Resin
   UP-2 was used.
2. Modifying Polymer
   A mixture of each of the soluble polymers shown in Table 8 and a microgel polymer produced from each of the rubbery substances and polymerizable monomers shown in Table 7 was used.
3. Preparation of Sheet Molding Compound (SMC)
   A sheet molding compound was prepared in accordance with the following recipe, and molded in the same way as in Example 1.

| | | |
|---|---|---|
| Unsaturated polyester resin (UP-2) | 65 | parts |
| Modifying polymer mixture | 12 | |
| Styrene | 23 | |
| Zinc Stearate | 4 | |
| t-Butyl perbenzoate | 1.5 | |
| p-Benzoquinone | 0.03 | |
| Calcium carbonate | 130 | |
| Magnesium oxide | 1.3 | |
| Chopped strand of glass fibers (fiber length 1 inch) | 95 | |

The results of tests on the SMC and molded articles are shown in Table 9.

Controls 16 and 17 were performed in accordance with Examples 20 to 43 except as noted below.

Control 16

In Example 23, 6.5 parts of S-2 was used (the total amount of S-2 was 12 parts) instead of 6.5 parts of G-3. The stability of SMC was poor, and the polymeric substance excuded onto the surface of the SMC to make it tacky.

Control 17

In Example 36, 6.5 parts of S-4 (the total amount of S-4 was 12 parts) was used instead of 6.5 parts of G-22. The stability of SMC was poor, and the polymeric material excuded onto its surface to make it tacky.

Table 7

| Polymers having a microgel structure | Rubbery substance (parts) | | Styrene | Methyl methacrylate | Polymerizable monomers (parts) | | | | | COOH content (wt.%) |
|---|---|---|---|---|---|---|---|---|---|---|
| | Polybutadiene | Styrene butadiene copolymer | | | Ethyl acrylate | Acrylonitrile | Divinyl benzene | Acrylic acid | Methacrylic acid | |
| G-15 | 15 | — | 26 | 56 | — | — | — | 3 | — | 1.9 |
| G-16 | 30 | — | 50 | — | 15 | — | — | 5 | — | 3.0 |
| G-17 | 10 | — | 15 | 46 | — | 26 | — | — | 3 | 1.4 |
| G-18 | 5 | — | 16 | 75.8 | — | — | 0.2 | 3 | — | 1.8 |
| G-19 | — | 40 | 20 | — | 37 | — | — | 3 | — | 1.8 |
| G-20 | 15 | — | 25 | 60 | — | — | — | — | — | 0 |
| G-21 | 30 | — | 50 | — | 20 | — | — | — | — | 0 |
| G-22 | 10 | — | 15 | 45 | — | 25 | — | — | — | 0 |
| G-23 | 5 | — | 20 | 74.8 | — | — | 0.2 | — | — | 0 |
| G-24 | — | 40 | 20 | — | 40 | — | — | — | — | 0 |

Table 8

| Soluble polymers | Composition of polymers (parts) | | | | | | | | | COOH content (wt.%) |
|---|---|---|---|---|---|---|---|---|---|---|
| | Styrene | Methyl methacrylate | Ethyl acrylate | Ethylene | Vinyl chloride | Vinyl acetate | Acrylic acid | Methacrylic acid | Monomethyl ester of maleic acid | |
| S-2 | — | 85 | 15 | — | — | — | — | — | — | 0 |
| S-3 | 100 | — | — | — | — | — | — | — | — | 0 |
| S-4 | 96 | — | — | — | — | — | 4 | — | — | 2.5 |
| S-5 | 20 | 77 | — | — | — | — | 3 | — | — | 1.9 |
| S-6 | — | — | — | 15 | — | 85 | — | — | — | 0 |
| S-7 | — | — | — | 12 | — | 84 | 4 | — | — | 2.6 |
| S-8 | — | — | — | — | — | 100 | — | — | — | 0 |
| S-9 | — | 82 | 13 | — | — | — | — | 5 | — | 2.6 |
| S-10 | — | — | — | 36 | — | 60 | 4 | — | — | 2.6 |
| S-11 | — | — | — | — | 13 | 82 | — | — | 5 | 1.8 |

Table 9

| Examples | Modifying polymers | | | | COOH content of modifying polymer (%) | Impregnatability in glass fibers | Solubility of SMC after 10 days storage (*) | Surface smoothness of molded articles | Adhesion of paint |
|---|---|---|---|---|---|---|---|---|---|
| | Soluble polymers Types | Amount (parts) | Microgel polymers Types | Amount (parts) | | | | | |
| 20 | S-2 | 4 | G-15 | 8 | 1.4 | Fair | Good | Good 130 | Good |
| 21 | S-3 | 4 | G-15 | 8 | 1.4 | " | " | Good 130 | Fair |
| 22 | S-4 | 5 | G-15 | 7 | 2.25 | " | " | Good 120 | " |
| 23 | S-2 | 5.5 | G-16 | 6.5 | 1.6 | " | " | Good 120 | " |
| 24 | S-5 | 6 | G-16 | 6 | 2.5 | " | " | Good 130 | " |
| 25 | S-8 | 6 | G-16 | 6 | 1.5 | " | " | Good 140 | " |
| 26 | S-6 | 6 | G-17 | 6 | 0.7 | " | " | Good 130 | Good |
| 27 | S-7 | 6 | G-17 | 6 | 2.0 | " | " | Good 120 | " |
| 28 | S-1 | 6 | G-18 | 6 | 1.8 | " | " | Good 120 | " |
| 29 | S-2 | 5 | G-19 | 7 | 1.1 | " | " | Good 140 | Fair |
| 30 | S-3 | 5 | G-19 | 7 | 1.1 | " | " | Good 130 | Inferior |
| 31 | S-4 | 5.5 | G-19 | 6.5 | 2.1 | " | " | Good 120 | " |
| 32 | S-5 | 5 | G-19 | 7 | 1.8 | " | " | Good 120 | Fair |
| 33 | S-9 | 6 | G-20 | 6 | 1.3 | " | " | Good 140 | Good |
| 34 | S-9 | 6 | G-24 | 6 | 1.3 | " | " | Good 130 | Fair |
| 35 | S-9 | 7 | G-22 | 5 | 1.5 | " | " | Good 130 | Good |
| 36 | S-4 | 6.5 | G-22 | 5.5 | 1.4 | " | " | Good 130 | Fair |
| 37 | S-5 | 6 | G-20 | 6 | 1.0 | " | " | Good 120 | Good |
| 38 | S-5 | 8 | G-23 | 4 | 1.4 | " | " | Good 130 | " |
| 39 | S-10 | 7 | G-20 | 5 | 1.5 | " | " | Good 130 | " |
| 40 | S-10 | 8 | G-21 | 4 | 1.9 | " | " | Good 140 | Fair |
| 41 | S-11 | 6 | G-16 | 6 | 2.4 | " | " | Good 140 | " |
| 42 | S-11 | 8 | G-23 | 4 | 1.35 | " | " | Good 120 | Good |
| 43 | S-11 | 6 | G-24 | 6 | 0.9 | " | " | Good 130 | Fair |
| Control 16 | S-2 | 12 | — | — | 0 | " | Inferior | Fair 550 | Good |
| Control 17 | S-4 | 12 | — | — | 2.5 | " | " | Fair 600 | Fair |

EXAMPLE 44

1. Preparation of Modifying Polymer Mixture

A glass reaction vessel equipped with a stirrer, a gas flow inlet tube, a condenser and a thermometer was charged with 30 parts, as solids content, of a latex of a copolymer of styrene and butadiene, 53 parts of methyl methacrylate, 13.5 parts of styrene, 3.5 parts of acrylic acid, 180 parts of ion exchanged water, 0.6 part of lauryl mercaptan, 2.0 parts of sodium dodecyl benzenesulfonate and 0.4 part of potassium persulfate. With good mixing, the reaction was performed for 6 hours in an atmosphere of nitrogen at 60°C. The resulting emulsion was salted out, washed and dried to obtain a powdery polymeric material (M-1). The test on the solubility of the polymer in styrene using a centrifugal separator showed that this polymer was a mixture of about 50 % by weight of the precipitated portion and about 50 % by weight of a portion soluble in styrene. It had a carboxyl content of 2.1 %.

2. Preparation of SMC

| | parts |
|---|---|
| Unsaturated polyester resin (UP-2) | 59 |
| Modifying Polymer (M-1) | 12 |
| Styrene | 29 |
| Zinc stearate | 3.5 |
| t-Butyl perbenzoate | 1.5 |
| p-Benzoquinone | 0.02 |
| Magnesium oxide | 1.0 |
| Kaolin | 120 |
| Chopped strand of glass fibers (fiber length 1 inch) | 95 |

A sheet molding compound was prepared in accordance with the above recipe. It was stable during storage for 3 months, and its surface did not become tacky. The impregnatability of it in glass fibers was good.

When the SMC was molded in the same way as in Example 19, the surface of the molded article was good, and it did not adhere to the mold to cause the loss of the surface luster of the molded article.

EXAMPLES 45 TO 54

These Examples will illustrate the advantages of adding the modifying polymer mixture to various unsaturated polyester resins.

1. Microgel Polymer
   G-15 or G-20 was used.
2. Soluble Polymer
   S-5 or S-7 was used.

3. Preparation of SMC

A sheet molding compound was prepared in accordance with the following recipe.

| | | |
|---|---|---|
| Unsaturated polyester resin | 63 | parts |
| Microgel polymer | 6 | |
| Soluble polymer | 6 | |
| Styrene | 25 | |
| Zinc stearate | 4 | |
| t-Butyl perbenzoate | 1.5 | |
| p-Benzoquinone | 0.02 | |
| Calcium carbonate | 120 | |
| Magnesium oxide | 1.5 | |
| Chopped strand of glass fibers (fiber length 1 inch) | 100 | |

4. Unsaturated Polyester Resin

UP-2 (Examples 45 and 50), UP-4 (Examples 46 and 51), UP-5 (Examples 47 and 52), UP-6 (Examples 48 and 53), and UP-7 (Examples 49 and 54) were used. The results are shown in Table 10 below.

Table 10

| Examples | Unsaturated polyester resin | Modifying polymers | COOH content of the modifying polymer (wt.%) | Impregnatability in glass fibers | Stability of SMC (*) | Surface smoothness of molded articles Period of storage | | | Adhesion of paint |
|---|---|---|---|---|---|---|---|---|---|
| | | | | | | 5 days | 10 days | 20 days | |
| 45 | UP-2 | G-15 S-5 | 1.9 | Fair | Good | Good 120 | Good 120 | Good 150 | Good |
| 46 | UP-4 | G-15 S-5 | 1.9 | " | " | Good 160 | Good 160 | Good 200 | " |
| 47 | UP-5 | G-15 S-5 | 1.9 | " | " | Good 120 | Good 130 | Good 150 | " |
| 48 | UP-6 | G-15 S-5 | 1.9 | " | " | Good 140 | Good 140 | Good 200 | " |
| 49 | UP-7 | G-15 S-5 | 1.9 | " | " | Good 130 | Good 130 | Good 160 | " |
| 50 | UP-2 | G-20 S-7 | 1.3 | " | " | Good 120 | Good 120 | Good 130 | " |
| 51 | UP-4 | G-20 S-7 | 1.3 | " | " | Good 180 | Good 180 | Good 200 | " |
| 52 | UP-5 | G-20 S-7 | 1.3 | " | " | Good 130 | Good 130 | Good 180 | " |
| 53 | UP-6 | G-20 S-7 | 1.3 | " | " | Good 140 | Good 140 | Good 150 | " |
| 54 | UP-7 | G-20 S-7 | 1.3 | " | " | Good 130 | Good 140 | Good 220 | " |

What we claim is:

1. An uncured unsaturated polyester resin composition useful in the production of molded articles of cured unsaturated polyester resins, the composition comprising
   1. 60 to 97 % by weight of an uncured unsaturated polyester resin which is a liquid mixture of at least one unsaturated polyester selected from the group consisting of the unsaturated polyesters from unsaturated dibasic carboxylic acid and the anhydride and dimethylesters thereof, ethylene oxide, propylene oxide or from said unsaturated dibasic carboxylic acid together with saturated dicarboxylic acid and said diol and at least one vinyl monomer for curing the polyester, and
   2. 40 to 3 % by weight of a modifying polymer of the microgel structure which is obtained by polymerizing, 97 to 30 % by weight of at least one vinyl monomer in the presence of 3 to 70 % by weight of at least one rubbery polymer having carbon to carbon double bonds in the molecule, is finely dispersible, without dissolving, in both of said unsaturated polyester resin and said unsaturated monomer for curing the polyester, and contains 0.1 to 10 % by weight of carboxyl groups in the molecule.

2. An uncured unsaturated polyester resin composition useful in the production of molded articles of cured unsaturated polyester resins, the composition comprising
   1. 60 to 97 % by weight of an unsaturated polyester resin which is a liquid mixture of at least one unsaturated polyester selected from the group consisting of the unsaturated polyesters from unsaturated dibasic carboxylic acid and the anhydride and dimethylesters thereof, ethylene oxide, propylene oxide or from said unsaturated dibasic carboxylic acid together with saturated dicarboxylic acid and said diol and at least one vinyl monomer for curing the polyester, and
   2. 40 to 3 % by weight of a combined modifying polymer component which comprises
      a. 80 to 5 % by weight of a polymer of the microgel structure which is obtained by polymerizing 97 to 30 % by weight of at least one radical polymerizable monomer in the presence of 3 to 70 % by weight of at least one rubbery polymer having double bonds in the molecule, and is finely dispersible, without dissolving, in both of said unsaturated polyester resin and said unsaturated monomer for curing the polyester, and
      b. 20 to 95 % by weight of at least one thermoplastic polymer soluble in at least one of said unsaturated polyester resin and said unsaturated monomer for curing the polyester,
   at least one of polymers (a) and (b) containing carboxyl groups being 0.1 to 10 % by weight based on the total weight of polymers (a) and (b).

3. The composition of claim 1 wherein said modifying polymer of the microgel structure further contains at least one kind of polar group other than a carboxyl group in the molecule.

4. The composition of claim 2 wherein at least one of said modifying polymers (a) and (b) further contains at least one kind of polar group other than a carboxyl group in the molecule.

5. The composition of claim 1 wherein said modifying polymer of the microgel structure is a polymer obtained by copolymerizing an unsaturated carboxylic acid with at least one of styrene, methyl methacrylate and acrylonitrile in the presence of polybutadiene or polyisoprene.

* * * * *